United States Patent [19]
Inoue

[11] 3,814,892
[45] June 4, 1974

[54] ELECTRODE FOR ELECTRICAL MACHINING

[76] Inventor: Kiyoshi Inoue, 3-16-8 Kamiyoga, Tokyo, Japan

[22] Filed: June 28, 1971

[21] Appl. No.: 157,575

Related U.S. Application Data

[63] Continuation-in-part of Ser. No. 723,799, April 24, 1968, Pat. No. 3,591,760, and a continuation-in-part of Ser. No. 508,487, Nov. 18, 1965, Pat. No. 3,512,384, and a continuation-in-part of Ser. Nos. 574,056, Aug. 22, 1966, abandoned, and Ser. No. 64,104, July 29, 1970.

[30] Foreign Application Priority Data

June 30, 1970 Japan.............................. 45-57143
Nov. 11, 1970 Japan.............................. 45-99279

[52] U.S. Cl. .................................. 219/69 E, 13/32
[51] Int. Cl........................................... B23k 9/16
[58] Field of Search.............. 219/69 D, 69 E; 13/32

[56] References Cited
UNITED STATES PATENTS

| | | | |
|---|---|---|---|
| 2,315,854 | 4/1943 | Holt | 219/120 |
| 2,909,641 | 10/1959 | Kucyh | 219/69 E |
| 3,240,915 | 3/1966 | Carter et al. | 13/32 X |
| 3,513,282 | 5/1970 | Fox | 219/69 E |

*Primary Examiner*—J. V. Truhe
*Assistant Examiner*—Hugh D. Jaeger
*Attorney, Agent, or Firm*—Karl F. Ross; Herbert Dubno

[57] ABSTRACT

An electrode for the electrical machining of a conductive workpiece by ECM or EDM is produced by high energy rate forming simultaneously with an index formation engaging in an electrode holder whereby a large number of such electrodes can be mass-produced and identically positioned. The electrode defines a space with the holder through which a coolant is circulated to limit thermal deformation in use.

5 Claims, 17 Drawing Figures

KIYOSHI INOUE
INVENTOR.

BY Karl F. Ross
ATTORNEY

KIYOSHI INOUE
INVENTOR.

BY  Karl G. Ross

ATTORNEY

KIYOSHI INOUE
*INVENTOR.*

ELECTRODE FOR ELECTRICAL MACHINING

CROSS-REFERENCE TO RELATED APPLICATIONS

This application is a continuation-in-part to my copending application Ser. No. 723,799, filed April 24, 1968 (now U.S. Pat. No. 3,591,760 of July 6, 1971) as a continuation in part of my applications Ser. No. 508,487 (now U.S. Pat. No. 3,512,384 of May 19, 1970) and Ser. No. 574,056 (now abandoned but replaced by a continuation Ser. No. 64,104 of July 29, 1970 which has since issued as U.S. Pat. No. 3,663,788 on May 16, 1972), filed November 18, 1965 and August 22, 1966, respectively. It is also related to my copending application Ser. No. 125,192 filed March 17, 1971 as a continuation-in-part of the aforementioned application Ser. No. 723,799 (U.S. Pat. No. 3,591,760).

FIELDS OF THE INVENTION

My present invention relates to a method of making an electrode for the electrical machining of a metallic workpiece, to an electrode produced by this method, and to a method of carrying out the shaping of a metallic body using such electrode.

BACKGROUND OF THE INVENTION

I and others have proposed numerous techniques in the electrical machining of metallic workpieces in which a preshaped electrode body is used to sink a cavity of predetermined shape in the metallic workpiece or to otherwise impart predetermined contours to the latter.

For example, in my U.S. Pats. No. 3,252,881; 3,357,912; 3,371,022 and 3,378,473, I have described systems for the electrochemical machining (ECM) of a metallic workpiece in which an electrode and a workpiece are displaced relatively in spaced relation while an electrolyte is supplied to the gap therebetween and an electrolysis current is passed through the tool electrode and the workpiece electrode to electrolytically erode portions of the workpiece juxtaposed with the electrode. The eroded portions, partly in solution and partly in the form of particles, are carried away by the moving electrolyte.

The technique is suitable for the sinking of cavities in a workpiece, for imparting desired contours thereto when a contoured tool electrode is employed and for the formation of holes in taps and the like anchored in a workpiece to enable braking up of the taps and subsequent removal. Further developments along these lines are described in my applications Ser. No. 511,827 (now U.S. Pat. No. 3,527,686) and Ser. No. 598,391 (replaced by continuation Ser. No. 859,532 since issued as U.S. Pat. No. 3,533,928), filed December 6, 1965 and December 1, 1966, respectively.

Another electrical machining technique involves the use of impulsive spark discharge which electromechanically chips particles of a workpiece from areas thereof juxtaposed with the tool electrode. In systems of this type, known generally as electric discharge machining (EDM), a servomechanism is employed to maintain a predetermined gap spacing between the tool electrode and the workpiece, which constitutes the other electrode, while a dielectric liquid of low conductivity floods the gap to act as a coolant and carry away the eroded particles. The power supply may include a capacitor bank and switching devices designed to apply high-energy current pulses across the gap to effect spark discharge. Such systems are described in my U.S. Pat. Nos. 3,333,081 and No. 3,360,683 as well as application Ser. No. 401,308, filed October 5, 1964 (now U.S. Pat. No. 3,409,753). It is also possible (see my application Ser. No. 535,268, filed January 19, 1966, now U.S. Pat. No. 3,417,006) to carry out a combined or sequential ECM and EDM operation by a system which can be designated electrochemical discharge machining (ECDM) wherein principles of both of the aforementioned techniques are used.

In both electrochemical machining and electric discharge machining, a significant problem arises vis-a-vis the electrode. Thus, electric machining results in an erosion of the electrode together with the workpiece, although with proper selection of the machining parameters and an appropriate choice of the electrode material, the electrode wear can be minimized. When, however, intricate contours are to be formed in or on the workpiece, even slight electrode wear poses a problem which will be readily recognized. Initially a precision contour, generally complementary to that desired in the workpiece, is formed in the tool electrode and electrochemical machining commences. During the roughing stages of shaping, especially when relatively deep cavities are to be sunk, the tool electrode loses precision and, as the final machining stage approaches, is incapable of imparting the desired final configuration to the workpiece with the requisite accuracy. Accordingly, a finish-forming electrode may be required or replacement of the electrode may be necessary at intermediate stages. Additionally, prior-art methods have made it necessary to prepare the electrodes by careful hand-machining or by shaping using highly skilled die makers with increasing cost. As a result, the overall costs of electrical machining processes have been higher than desirable, especially when deep cavities with intricate contours are to be made.

I may also mention a major disadvantage of prior art electrical machining systems using sheet metal electrodes or electrodes of small wall thickness. Such electrodes, especially when intended to machine large areas, are subjected to severe heating which causes thermal deformation. For example, a cup-shaped electrode for sinking cavity in the workpiece acts as a membrane which may flex and deflect under thermal stress to reduce the accuracy of the cavity reproduced in the workpiece. Consequently, the electrodes must be discarded after such deformation and replaced by undeformed electrodes of greater position. This is a disadvantage not only because it prolongs the electrical machining process, but also because the manufacture of large numbers of electrodes is problematical and expensive as noted earlier. Finally, in spite of efforts to reproduce large numbers of electrodes with great accuracy so that they may be replaced upon deformation, the prior-art electrodes cannot be readily positioned with sufficient accuracy to guarantee a high precision in the electrical machining process.

OBJECTS OF THE INVENTION

It is, therefore, the principal object of the present invention to provide an improved method of making an electrode for the chemical machining of metallic workpieces in which the production costs are reduced, numerous similar electrodes can be made of substantially identical configuration with a minimum of labor cost, and the use of the electrodes can reduce the overall cost of electrical machining processes.

Still another object of this invention is to provide an improved electrode structure for the electrochemical and/or electric-discharge machining of a metallic workpiece.

Yet another object of this invention is to provide an improved method of electrical machining a conductive workpiece in which low machining cost is combined with surprisingly high precision and short machining time.

It is another object of the present invention to provide a method of making and using an improved electrode of small wall thickness, whereby the effect of thermal deformation is minimized.

Still another object of the invention is to provide a grooved electrode structure which has reduced thermal deformation and is capable of electrical machining a conductive workpiece with great accuracy.

It is also an object of the invention to provide an electrode, a method of machining using same and a method of making the electrode which will extend the principle set forth in application Ser. No. 723,799 (U.S. Pat. No. 3,591,760).

SUMMARY OF THE INVENTION

I have now found that it is possible, in spite of earlier beliefs that best machining results and minimum effect of electrode wear were obtainable with massive solid electrodes, to make use of a sheet-metal electrode which has been conformed to a master contour by high-energy-rate or shock-forming in the electrochemical machining or electric discharge machining of a metallic workpiece without any disadvantage whatsoever and, in fact, with the surprising advantage that numerous identical electrodes can be made rapidly and without difficulty for replacement of electrodes subject to wear or for use at various stages in the machining process. Thus, a principal feature of the present invention resides in the use, in electrochemical machining or electric-discharge machining, especially cavity sinking, of a metallic workpiece, of a sheet-metal electrode of substantially uniform cross-section and thickness which has been given the desired configuration by high-energy-rate forming in accordance with the principles established in my U.S. Pat. Nos. 3,208,255 and 3,232,085, and as further developed in U.S. Pat. No. 3,591,760 and copending application Ser. No. 64,104 (U.S. Pat. No. 3,663,788) which has replaced application Ser. No. 574,056.

The electrode structure of the present invention comprises clamping means designed to retain the sheet-metal electrode which is preferably provided with a planar outwardly extending peripheral flank adapted to be received between a pair of clamping portions including, for example, a lower clamping ring through the center of which passes the machining portion of the electrode. The latter may be provided with one or more openings through which the coolant (i.e. electrolyte in the case of electric-discharge machining) is passed.

The shock-forming of the electrode is preferably carried out with a nonconductive liquid force-transmitting medium in which an arc-type or spark-type discharge is effected. The discharge can be initiated by fusion of a wire or other fusible element bridging the gap between a pair of electrodes. The die cavity beneath the electrode blank is, advantageously, evacuated to prevent the development of fluid cushions which might impede conformance of the blank to the contours of the die. When large-area electrodes are employed, a series of shock waves is rolled over the surface of the blank. The shock-forming process also provides a formation in the annular peripheral flange of the electrode for mating engagement with the flange of the clamping ring to assure precise reproducible positioning of the successive electrode mounted in the electrode holder.

According to a further feature of this invention, a spacer layer is applied along the underside of the blank prior to the shock forming thereof in the underlying die. This spacer layer, which may be stripped from the finished tool electrode, is designed to impart an outline to the electrode just under that necessary for the finish-forming electrode, the underside electrode being then employed for rough-forming. Prior to the development of this technique, it was necessary to provide a separate master for the rough-forming electrode and the finish-forming electrode. After the production of the rough-forming electrode with a spacer layer as indicated, the cavity can be used to form the finishing electrode without the spacer layer. Alternatively, the spacer layer can constitute the finish-forming electrode upon its removal from the rough-forming portion.

I have already alluded to the problem which arises in large-area electrical machining, of the ECM or EDM type, using thin-walled or sheet metal electrodes. Such electrodes, when of hollow construction as is customarily the case, are characterized by thermal deformation much as a membrane of metal is deformed when heated. Such deformation necessarily changes the shape of the electrode and reduces the machining accuracy. One way of avoiding the loss of accuracy and precision resulting from such thermal deformation and rapid wear of a sheet metal electrode is to replace the electrode with another virgin electrode formed substantially identically to the first. However, difficulties have been encountered in accurately positioning the electrode so that the replacement step has itself led to inaccuracy in the machining process. These inaccuracies can be avoided when the sheet metal electrode is shaped by high energy force as described earlier and is provided simultaneously with its shock wave forming, with an indexing formation complementary to and engaging the electrode holder of the machining apparatus. Since sheet metal electrodes can be reproduced with substantially perfect identity or reproduceability in a die, each will have its indexing formation located at the precise point enabling the replacement electrodes to be accurately positioned in the holder.

In addition, I have found that much of the precision loss which has hitherto been attributed to small deformations can be eliminated when the electrode surface remote from the machining face is treated with a coolant, preferably a liquid. Surprisingly, the significant membranous deformation mentioned earlier can be eliminated entirely or reduced to an insignificant level when a coolant liquid is circulated in heat-exchanging relationship with the electrode wall. The term "heat-exchanging relationship" is used herein to refer to direct contact whereby a liquid is simply circulated into contact with the electrode wall, as well as to indirect heat exchange whereby the coolant is circulated in contact with a heat conductive medium which, in turn lies in in intimate contact with the electrode wall.

Surprisingly, the latter metal may be a soft low-melting metal such as zinc, tin, lead or an alloy thereof such as solder which is cast into the electrode after it has been shock-formed and, in turn, receives a cooling coil which is embedded in the low-melting point metal.

Surprisingly, these methods of eliminating or reducing the thermal deformation effect have proved to be satisfactory in limiting the loss of precision hitherto obtained with sheet metal copper electrodes in electrical machining.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
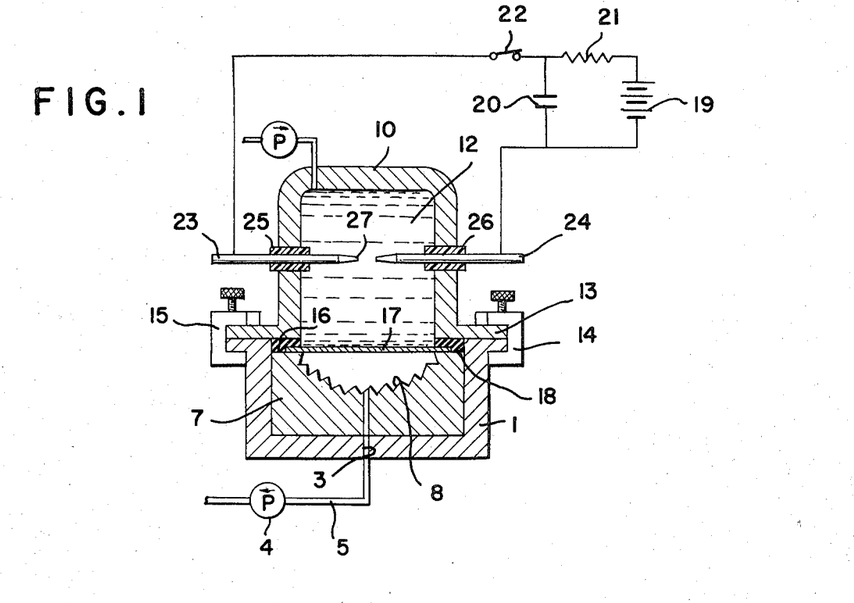
FIG. 1 is a vertical cross-sectional view through an apparatus for making an electrode in accordance with the present invention.

In FIG. 1, I show a system for the production of an electrode for the electric machining of a metallic workpiece generally patterned after the shock-forming systems of my earlier applications Ser. No. 508,487, filed November 18, 1965 and Ser. No. 574,056, filed August 22, 1966, and the prior applications and patents mentioned therein. This system comprises an upwardly open lower housing portion 1 having an outer peripheral flange 2 and formed with an opening 3 communicating with a suction pump 4 via a line 5. The chamber 6 of this lower housing portion receives a die 7 whose cavity 8 is intricately contoured and forms a master for the tool electrode to be produced. The cavity 8 can be evacuated by the pump 4 which communicates therewith via a bore 9 formed in the replaceable die 7 and registering with the aperture 3.

The upper housing portion 10 is a downwardly open cylinder whose chamber 11 receives a nonconductive liquid dielectric 12 (e.g. kerosene or transformer oil) which acts as a force-transmitting medium in the shock-wave generator. An outwardly extending peripheral flange 13 of the upper housing portion 10 overlies the flange 2 so that clamps 14 and 15 may sealingly secure the upper and lower housing portions together. The die 7 has a ledge 16 upon which the relatively thin electrode blank 17 is disposed, the blank being composed of copper, brass or other copper alloy and having a thickness preferably in the range of 0.5 to 10 mm although best results are obtainable with electrodes of 1 – 4 mm in thickness. The blank 17 is peripherally overlain by a sealing washer 18 clamped between the upper and lower housing members 1 and 10.

The energy source for the forming operation comprises any of those described in the last-mentioned spark- or shock-forming applications and patents and may include a d.c. source such as the battery 19 which can charge the capacitor bank represented at 20 through the charging resistor 21. When switch 22 is closed, the capacitor 20 discharges across a pair of electrodes 23 and 24 slidable radially in insulating sleeves 25 and 26 at diametrically opposite locations of the upper housing portion 10. The electrodes 23 and 24 can be advanced toward one another in step with the electrode consumption to maintain a constant electrode gap 27 therebetween. It will be noted that the switch 22 can be omitted when breakdown across the gap 27 is initiated by advance of at least one of the electrodes 23, 24 toward the other until the potential across the electrodes exceeds the breakdown voltage of the remaining gap distance. One or more discharges can be generated across the gap 27 to shape the blank 17 to conform to the contours of the cavity 8 as represented for the shaped sheet-metal body 28 in FIG. 2. The electrode can be completed by a plate 29 which spans the open side of the electrode and is welded or soldered thereto along the annular seam 30. To ensure proper positioning of the plate electrode holder 29 on the electrode 28, the latter is left in the die 7 after removal of the upper housing member 10 and a jig 31 (FIG. 3) is mounted on the flange 2.

Figure 2:
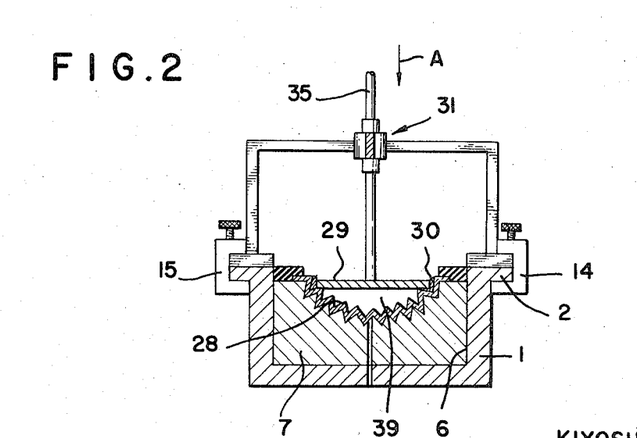
FIG. 2 is a cross-sectional view showing an assembly for mounting the electrode holder thereon.
Figure 3:
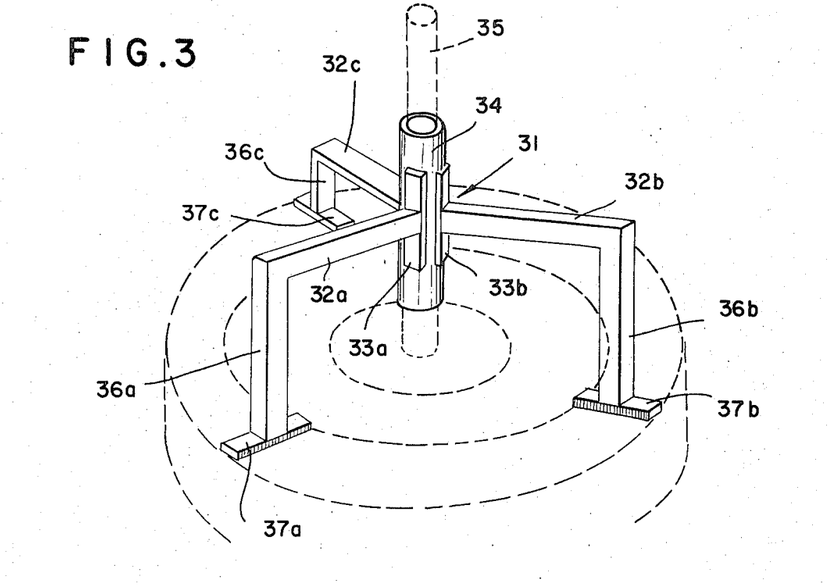
FIG. 3 is a perspective view of the jig of this assembly.

The jig comprises a spider arrangement of three angularly equispaced radially extending legs 32a, 32b and 32c which are welded via blocks 33a, 33b etc. to a sleeve 34 accommodating the rod 35 of the electrode assembly. The legs 32a - 32c have downwardly extending shanks 36a – 36c which terminate in radially extending feet 37a – 37c. The feet rest upon the flange 2 and may be retained in place by the clamps 14 and 15. The plate 29 is welded to the rod 35, constituting the electrode holder. The rod 35 is inserted from below into the sleeve 34 of the jig 31 and the latter then positioned as shown in FIG. 2. The rod 35 can then be lowered (arrow A) to bring the plate 29 into contact with the electrode 28 which is welded thereto at the seam 30 as previously indicated. The rod 35 may be provided with an axial bore serving to deliver electrolyte or dielectric coolant to the chamber 39 formed between the plate 29 and the electrode 28. The latter may be perforated to deliver the coolant to the machining gap. As noted earlier, the electrode of FIG. 2 can be used for electrochemical or electric-discharge machining.

Figure 4:
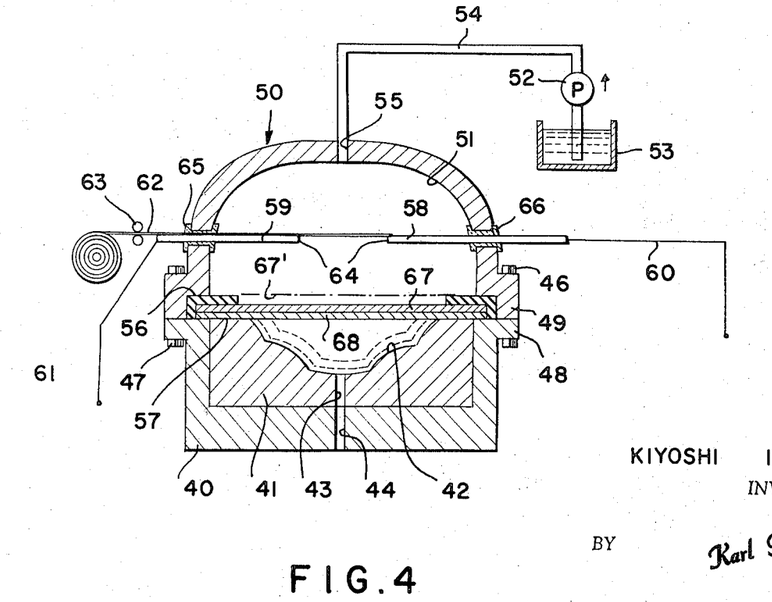
FIG. 4 is a view similar to FIG. 1 of another apparatus in accordance with this invention.

In FIG. 4, I show a alternative embodiment wherein the lower housing member 40 receives the die 41 whose cavity 42 communicates via bore 43 and a registering aperture 44 of the housing with a suction pump as described in connection with FIG. 1. Here, however, the clamps are replaced by bolts 46 and 47 designed to lock the flange 48 of the lower housing member 40 to the flange 49 of a dome-shaped upper housing member 50. The dielectric fluid may, as in the system of FIG. 1, be supplied to the chamber 51 of the upper housing part by a pump 52 from a reservoir 53. A line 54 connects the pump 52 with an inlet fitting 55 at the upper end of housing member 50. The latter clamps a gasket 56 against the edge 57 of the die 41 and against the flange 48 to prevent loss of pressure from the chamber 51 or escape of fluid.

In this embodiment, the discharge means includes a pair of principal electrodes 58 and 59 which are connected by leads 60 and 61 to a discharge source such as that shown at 19, 20 and 21 of FIG. 1 Here, however, the discharge can be initiated by the temporary bridging of the electrodes 58 and 59 by a fusible wire 62 fed by the rollers 63 across the gap 64 between the electrodes. The electrodes 58 and 59 are received in insulating bushings 65 and 66. A discharge is initiated here when the fusible wire 62, whose thickness is a small fraction of the thickness of the electrode rods 58 and 59, is in slidable electrically contacting relation with the electrode 59 and is advanced across the gap until it approaches electrode 58. The current surge from the capacitor causes fusion and resistive-heating destruction of the wire 62 spanning the space 64, thereby resulting in automatic formation of an increasing gap sustaining a widening discharge until the capacitor is drained. This system augments the power available for shaping the workpiece.

The workpiece here includes a metal blank 67, e.g. copper of a thickness of 1 – 4 mm, along the underside of which is provided a spacing layer 68. The latter may be a thin foil of paper secured by a contact or pressure-sensitive adhesive to the metal sheet, a plastic laminate deposited in situ or bonded as a foil to the sheet-metal blank, a spray, roller or dip-coated layer or, as described in connection with FIGS. 8A and 8D, another metal foil which may be removed from the blank 68, in a convenient manner. If the solid-line contour of the cavity 42 corresponds to the dimensions and contour of the cavity to be formed in the workpiece, overcutting can be avoided by rough-forming the electrode so that its outer contours are somewhat undersized. The shim or spacer layer 68, which may have a thickness ranging from 1 mm to 4 mm but can be as thin as 0.1 to 1 mm, separates the blanks 66 from the contour 42 as represented by the dotted lines in FIG. 4.

Figure 5:
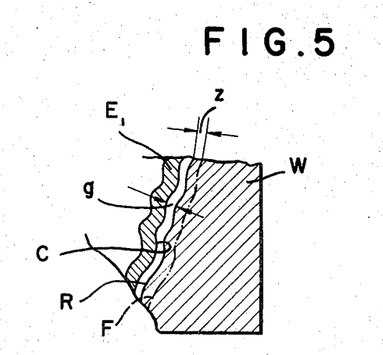
FIG. 5 is an enlarged cross-sectional view showing the relationship between electrode and workpiece in accordance with the principles of this invention.

In FIG. 5, I have diagrammatically illustrated the principle involved in the use of the shim. Here the workpiece W is machined by the rough-finishing electrode $E_1$ at a spacing g constituting the machining gap and approximately equal to the thickness of the spacer layer 68. As a consequence, the rough-forming contour R is formed without danger of overcutting. Should a spacer 68 not have been provided in the cavity 42 (FIG. 4), the contours C of the electrode $E_1$ would have been substantially of the dimensions of the finished contour F (FIG. 5) with the possibility of overcutting. In the system of the present invention, when the machining is carried out until a thin zone Z remains between the desired contour and the roughed-out surface R, the electrode $E_1$ is replaced by an electrode $E_2$ (see FIGS. 8A – 8D) and the small amounts of material remaining are removed therewith.

Figure 6:
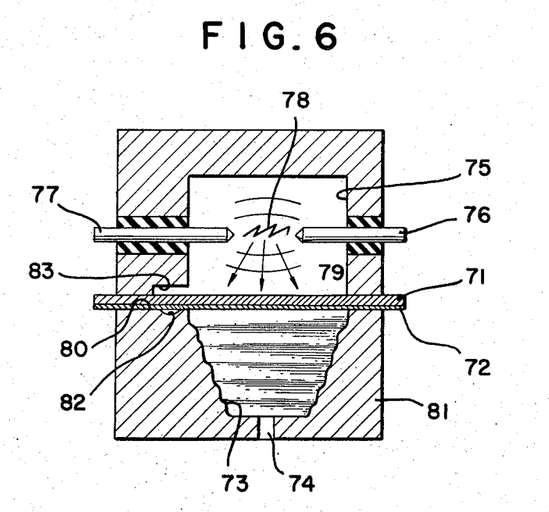
FIG. 6 is a cross-sectional view through another apparatus for making an electrode.
Figure 7:
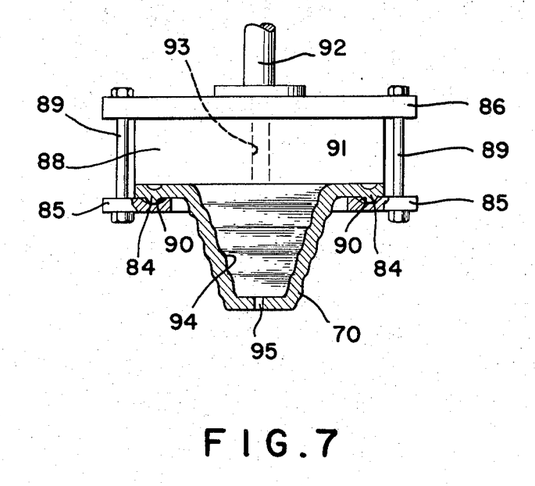
FIG. 7 is a representation of the electrode assembly made with the system of FIG. 1.

In FIG. 6, I show an apparatus for making an electrode 70 in which the blank 71 is provided with an underlying layer 72 and is disposed above a cavity 73 which can be evacuated via a port 74. In this embodiment, a gas chamber 75 is formed above the blank 71 and has a pair of electrodes 76 and 77 energized by the circuit shown in FIG. 1 to promote a spark discharge 78 across the gap therebetween. The resulting shock wave is propagated in the direction of arrow 70 to shape the blank 71 and constitute a rough-forming electrode $E_1$ therefrom. Along the ledge 80 of the lower housing member 81, however, I provide a depression 82 while above the blank 71, the chamber 75 is formed with an antechamber 83 overlying the recess 82. The shock wave in the region thus forms a protuberance 84 on the annular peripheral flange 85 of the electrode (FIG. 7).

The electrode holder here comprises a clamping device having a plate 86 and a ring 87 which draws the electrode 70 against a boss 88 when the bolts 89 are tightened. For accurate positioning of the electrode 70, e.g. to ensure identical orientation of the finish-machining and rough-machining electrodes or for mass production of numerous bodies the ring 87 is provided with recesses 90 complementarily receiving the protuberances 84. Through the central aperture 91 of the ring, the machining portion of the electrode 70 protrudes. The boss 88 and its shaft 92 are provided with a bore 93 communicating with the interior 94 of the electrode to deliver the dielectric coolant to the gap via its aperture 95.

A preferred operational sequence is shown in FIGS. 8A – 8D and prior to discussing the sequence it should be pointed out that the shock-forming electrode-shaping device may be mounted upon an electric-discharge machining apparatus to provide the shock waves necessary to shape the electrode.

Figure 8:
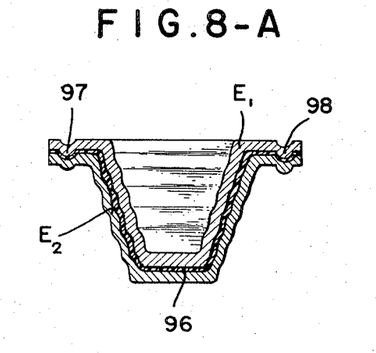
FIG. 8A – 8D represent sequential steps in a process for electric discharge machining of a workpiece in accordance with the principles of the present invention.

In FIG. 8A, I show an arrangement in which the shim layer consists of a copper sheet separated from the roughing electrode by a parting layer 96 of an antifriction material such as polytetrafluorethylene (Teflon). The parting layer may be applied as a spray to the underside of the blank forming the roughing electrode $E_1$ as a sandwich with the finishing electrode $E_2$. Both electrodes have the protuberances 97 and 98 receivable in the ring 87 as previously mentioned. After shock forming (FIG. 8A), the electrodes are separated (FIG. 8B) and the parting layer removed by solvent or mechanical polishing. In FIG. 8C, the rough-forming electrode $E_1$ is shown in use for the rough-forming of a cavity R in the workpiece W which is intended to be shaped to the finished configuration F represented by a dot-dash line in FIG. 8C and a solid line in FIG. 8D. In these Figures, the rough-forming electrode $E_1$ and the finish-forming electrode $E_2$ are shown to be displaced downwardly (arrow 99) by a servomotor arrangement 100 to maintain constant the width of the gap g and g' between rough-forming electrode $E_1$ or finish-forming electrode $E_2$ and the workpiece W. A spark-discharge power supply is here connected between the electrode $E_1$ or $E_2$ and the workpiece W as represented at 101 while the dielectric liquid is supplied at 102. The means for circulating the dielectric liquid through the gap and for effecting the servocontrolled displacement of the electrodes $E_1$ and $E_2$, and the power-supply means can be those described and illustrated in U.S. Pat. Nos. 3,333,081 and 3,360,583 or application Ser. No. 401,308 filed October 5, 1964 (now U.S. Pat. No. 3,409,753) and the patents and applications mentioned therein. When the electrode $E_1$ has reached the point illustrated in FIG. 8C, it is dismounted from the support (FIG. 7) and replaced by the electrode $E_2$ which previously had constituted the spacer or shim layer. Finish-forming continues as shown in FIG. 8D.

It has been found that the electrodes made by shock-forming in the manner previously described afford greater accuracy than has been possible with prior-art electrode systems of the character described, for example, in the last-mentioned patents and applications and is capable of an accuracy in reproducing the master contour in the finished product of about ±0.05 mm or better. The plate welded to the electrodes in FIG. 2 will customarily be used whenever the electrode is relatively thin and indeed it is possible to fill or partly fill the chambers 39 and 94 of the electrodes with metal or a potting material to reinforce the electrode. Furthermore, a layer of relatively soft metal may be provided above the blank as represented by the dot-dash line 67' in FIG. 4 to prevent splitting of the blank 67 when the latter is driven into the die master by a shock wave and the die has sharp contours of the type represented in FIGS. 1 and 2. Typical laminates for the purpose include nickel and tin which may be welded to the blank 67 and annealed prior to shock-forming or thereafter, thereby relieving strain.

As has already been noted, the formation of the protuberance 84 on the flange of the sheet metal electrode 70 by the shock-forming of the sheet metal workpiece 71, 72 into a die 73, 82 provided with a recess dividing this protuberance, simultaneously provides on the tool electrode an index mark which can engage in an indexing recess 90 in the tool holder.

Figure 12:
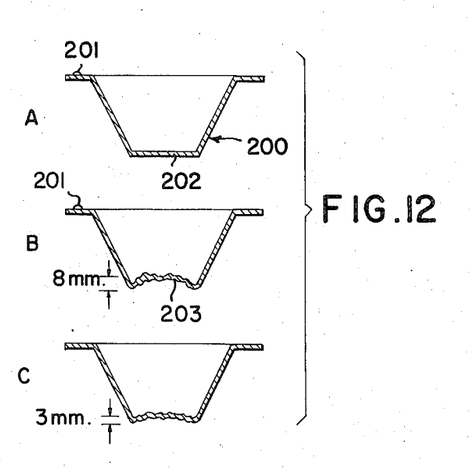
FIG. 12 shows at A, B and C disgrammatically the results obtained with and without cooling.

In FIG. 12, the importance of such an indexing mark has been illustrated in terms of the effect upon the tool electrode of thermal deformation. As will be apparent, the tool electrode illustrated at A in FIG. 12 is in its virgin state and will provide with a protuberance at 201 during the shock-forming process. In use without cooling, in a typical electrical machining process, the base 202 of the electrode 200 may deform to a maximum deformation height of 8 mm as shown at 203. This deformation, of course, results in a parallel inaccuracy in the workpiece. As the deformation increased, the electrode becomes progressively more useless and eventually must be replaced and repalced. Since the shock-forming process is capable of mass-producing these sheet metal electrodes with high reproduceability and accuracy, the fact that each electrode is provided with an index mark allows them to be inserted into the electrode holder (FIG. 7) with an orientation determined by the index mark and without any difficulties in respect to missalignment.

Since the process is not time-consuming it is more economical to replace the electrodes with nondeformed or virgin electrodes at high frequence. The sheet metal electrodes are mass-produced and the protuberance may be one of a number of indexing formations. Such formations may also include notches, recesses and ridges.

Figures 9, 11:
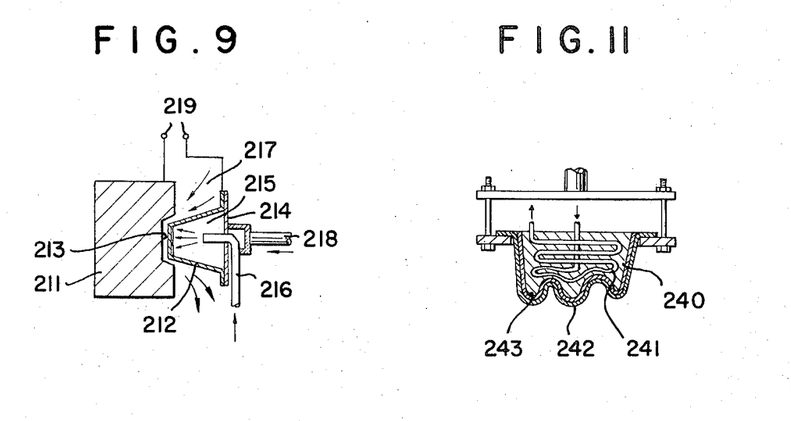
FIG. 9 is an axial cross-sectional view showing an electrode according to the present invention for the machining of a workpiece.
FIG. 11 is a view similar to FIG. 10 showing another embodiment.

Referring now to FIG. 9, it can be seen that an important feature of the invention resides in the cooling of the two electrodes during electrical machining, preferably independently of the circulation of a dielectric cooling therethrough and/or through and along the exterior of the electrode. While I have not shown the indexing means in FIGS. 9 through 11 and 13, it should be understood that indexing devices are provided to facilitate replacement and interchange of shock-formed electrodes.

In FIG. 9, from which the remainder of the electrical machining apparatus shown in FIGS. 8A through 8D has been omitted, the workpiece is represented at 211 and can be a die to be formed with a die cavity 213. The tool is a cup-shaped sheet metal electrode 212 clamped in a holder 214 and defining a chamber 215 into which water is forced by a tube 216 at various rates. The electrolyte or dielectric is introduced into the gap as represented at 217 and the electrode is advanced by a servomechanism via the shank 218 at a constant rate. An electrodischarge machining source is connected at 219 across the electrode and workpiece and the coolant is removed through the hollow shank 218.

EXAMPLE I

Using the system of FIG. 9 for electric discharge machining, the electrode 212 was a copper frustocone having a thickness of 0.8 mm, a base diameter of 44 mm, an altitude of 40 mm and a diameter at the broad side of the frustocone of 90mm. The mean EDM was 100 amperes and the mean EDM potential 25 volts. An attempt was made to determine the relationship between the machining power and the accuracy with and without a coolant and it was found that without a coolant circulated through the electrode, deformations of up to 8 mm in the sheet metal electrode occurred with consequent loss of accuracy. With 8 liters/min. of water circulated through the electrode, deformation at inaccuracies could be reduced to 2 mm. With circulation of 8 liters/min of kerosene oil, deformation was reduced to 1.2 mm and 1 kw dissipated as contrasted with 0.8 kw with the water circulation. Increasing the flow rate of the coolant to 24 liters/min reduced the deformation to 0.1 mm and increased the dissipation of thermal energy to 1.8 kw. When pulse frequency of 120 Hz was used in the last example, the deformation was lowered to 0.08 mm and a further reduction was gained to 0.06 mm with a pulse frequency of 22 kHz.

Figure 13:
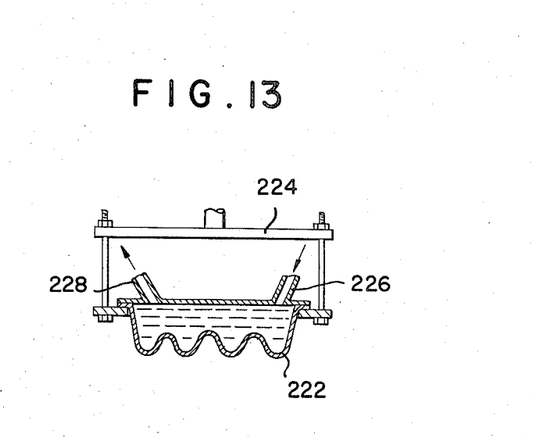
FIG. 13 is a view similar to FIG. 10, also illustrating the present invention.

A similar system has been shown in FIG. 13 in which the electrode 222 is provided with an inlet 226 and an outlet 228 for the liquid coolant. Here the electrode is clamped in a jig 224 and may be provided with a protuberance as previously discussed. The system has been illustrated for electric discharge machining and in FIG. 14 I have shown a graph of the electrode/workpiece wear ratio in percentage (plotted along the ordinate) against electrode thickness in millimeters plotted along the abscissa.

EXAMPLE II

Figure 14:
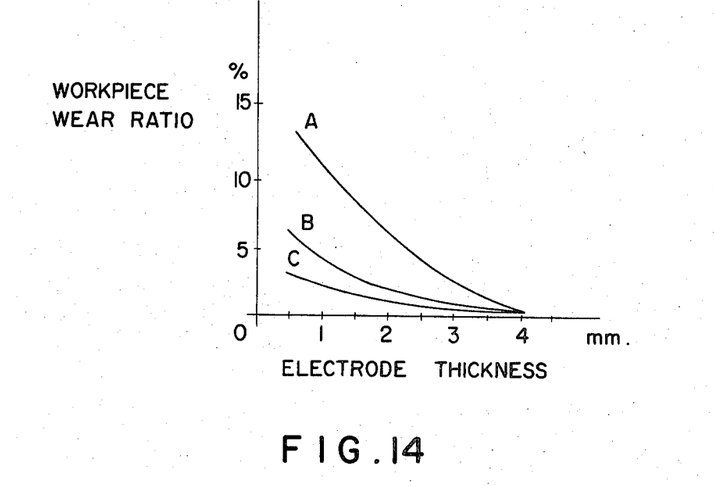
FIG. 14 is a graph in explanation of the invention.

Using an electric discharge machining with a workpiece of S 55 C carbon steel (0.55 percent by weight carbon), a copper electrode manufactured by high energy forming as previously described was used, the machining pulse width was 1.2 mm/sec and the peak current 80 amps. Graph A illustrates the characteristics without cooling of the electrode, graph B the characteristics obtained when the electrode is cooled with kerosene oil at a temperature of 20°C circulated through the electrode at a rate of 8 mm/sec. Graph C shows the results with water at 18°C at a flow velocity of 15 m/sec. It is evident that the cooling is capable of reducing the electrode where to a significant extent in addition to increasing the accuracy as already noted.

Figure 10:
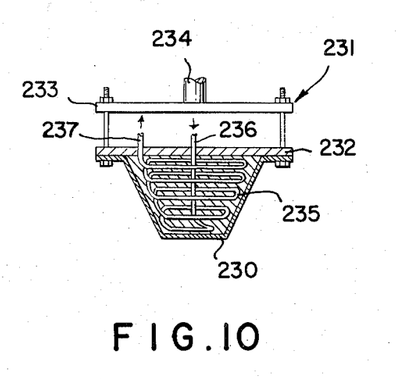
FIG. 10 is another axial cross-sectional view illustrating the present invention.

I have found it to be advantageous also to use a form of indirect cooling as has been shown diagrammatically in FIGS. 10 and 11. In the system of FIGS. 9 and 13 the coolant liquid has been brought into direct contact with the sheet metal electrode. However, in FIG. 10, the sheet metal electrode 230 is connected to the electrode holder 231 by clamping against a plate 232 and supporting the plate in a jig 233. The latter is connected by a shank 234 to the servomechanism. As previously indicated, the sheet metal electrode and the electrode holder may have mating or complementary formations for alignment purposes. As the cooling means, I provide a series of turns 235 of copper tubing or tubing of some other heat-conductive material so that the tube nest conforms generally to the contours of the electrode with the major tube length extending parallel to the principal machining surface. An inlet 236 and an outlet 237 are led from the interior of the electrode and are connected to a circulation system including temperature control means for dissipating the thermal energy evolved at the electrode. To increase the heat exchange between the electrode and the coolant tubes, a low melting point metal, preferably, tin, zinc or lead or alloys thereof, especially solders, are cast into the electrode. The solders and potting metal generally, also provide mechanical support against the formation especially when the electrode has a thickness of a fraction of 1 mm.

In the system of FIG. 11, the metal body 240 is cast around the tubes 241 which are bent to conform to the shape of the electrode 242. The cooling unit can then be inserted into the electrode and soldered therein with a layer 243 of low-melting point metal.

At A through C of FIG. 12, I have shown the deformation of an electrode in an idealized form corresponding to example III below.

EXAMPLE III

The sheet metal electrode of FIG. 2 has a thickness of 0.8 mm, an altitude of 40 mm, a small-base diameter of 50 mm and a large-base diameter of 90 mm. The system is used for the EDM machining and a workpiece for a period of 2.5 hours under no-wear conditions without cooling and is found to have a deformation of 8 mm as illustrated at B. With cooling using tap water at 12°C at a rate of 1 liter/min. with a copper tube having an 8 mm outside diameter and a wall thickness of 0.5 mm, the deformation was reduced to a negligeable level. Solder was the heat transfer metal. When the experiment was carried out with direct cooling at a flow rate of 8 liter/min, the maximum diformation was 3 mm as shown.

The invention described and illustrated is believed to admit of many modifications within the ability of persons skilled in the art, all such modifications being considered within the spirit and scope of the appended claims.

I claim:

1. An electrode for the electrical machining of a workpiece comprising a shock-formed body having a wall provided with machining surface of complementary configuration to that desired in said workpiece, a shockformed indexing formation, an electrode holder provided with a formation complementarily receiving said indexing formation and enabling a multiplicity of such electrodes to be replaceable mounted in said holder in precise alignment, means for passing a coolant through said body portion of said electrode exclusively along a side of said wall opposite said machining surface, and means for passing an electrical-machining liquid exclusively along said surface of said body independently of said coolant.

2. An electrode for the electrical machining of a workpiece comprising a shock-formed body having a complementary configuration to that desired in said workpiece, a shock-formed indexing formation, an electrode holder provided with a formation complementarily receiving said indexing formation and enabling a multiplicity of such electrodes to be replaceably mounted in said holder in precise alignment, and means for passing a coolant through said body portion of said electrode exclusively along a side thereof remote from its machining surface, said means including a tube extending through the interior of said electrode in heat-exchanging relationship with a wall thereof.

3. The electrode as defined in claim 2 further comprising a body of metal bridging said tube and said wall.

4. The electrode as defined in claim 3 wherein said metal is a low melting point metal selected from the group which consists of lead, tin, zinc and alloys thereof.

5. An electrode system for the electrical machining of a workpiece comprising an electrode holder, a sheet metal body mounted on said holder and means for passing a coolant liquid through said body exclusively along a side thereof opposite its machining surface and independently of a machining coolant, said means including a tube arrangement received in said electrode, and a mass of low melting point metal bridging said tube arrangement and an electrode wall.

* * * * *